UNITED STATES PATENT OFFICE.

HARRY D. BAUMGARDNER, OF FREDERICK, MARYLAND.

PROCESS OF CURING MEATS.

1,217,134.

Specification of Letters Patent. Patented Feb. 27, 1917.

No Drawing. Application filed July 11, 1913. Serial No. 778,479.

*To all whom it may concern:*

Be it known that I, HARRY D. BAUMGARDNER, a citizen of the United States, residing at Frederick, Frederick county, and State of Maryland, have invented and discovered certain new and useful Improvements in Processes of Curing Meats, of which the following is a specification.

My said invention consists in an improved process of curing meats, particularly cuts of pork, such as hams, shoulders, and bacon.

Said process consists in first preparing a special "pickle" or brine, placing the meat in said brine for a specified period of time and then removing from the brine and smoking the same.

Said brine is prepared as follows: For each one hundred pounds of meat I take seven pounds of coarse salt, two pounds of brown sugar, and two ounces of saltpeter, and mix these ingredients with four gallons of soft water. The whole is boiled and stirred during the boiling, until all is thoroughly mixed and the solids dissolved. During the boiling the waste products rising to the surface are skimmed off and after the whole is thoroughly mixed and in solution, it is allowed to cool. When cold the brine or liquor thus formed is poured over the meat (approximately 100 pounds) and the meat allowed to stand therein for a period of five weeks. It is then removed and cured by smoking in the well known manner.

While I have found in practice that these proportions and the period of time stated for pickling to produce the most desirable results, it is obvious that slight variations may be made without material differences in results.

Having thus fully described my said invention, what I claim as new and desire to secure by Letters Patent is:

The process of curing meat which consists in preparing a brine by mixing, for approximately every 100 pounds of meat, about seven pounds of coarse salt, two pounds of brown sugar, and two ounces of saltpeter, adding to these ingredients four gallons of soft water, then boiling the mixture and stirring during the boiling until all the solids are dissolved, skimming off the waste products rising to the surface and after the whole is thoroughly mixed and in solution, allowing it to cool; pouring the cooled brine thus formed over the meat (approximately one hundred pounds) and allowing the meat to remain in the brine for a period of about five weeks, then removing and curing the meat by smoking, substantially as set forth.

In witness whereof, I have hereunto set my hand and seal at Frederick city, Maryland, this 2nd day of July, A. D. nineteen hundred and thirteen.

HARRY D. BAUMGARDNER. [L. S.]

Witnesses:
WM. D. ZIMMERMAN,
A. LE ROY MCCARDELL.

Copies of this patent may be obtained for five cents each, by addressing the "Commissioner of Patents, Washington, D. C."